US010812484B2

(12) United States Patent
PalChaudhuri et al.

(10) Patent No.: US 10,812,484 B2
(45) Date of Patent: Oct. 20, 2020

(54) LEAK-PROOF CLASSIFICATION FOR AN APPLICATION SESSION

(71) Applicant: HEWLETT PACKARD ENTERPRISE DEVELOPMENT LP, Houston, TX (US)

(72) Inventors: Santa PalChaudhuri, Bangalore (IN); Prateek Kapoor, Bangalore (IN); Jagachittes Vadivelu, Bangalore (IN); Sudeepto Roy, Bangalore (IN); Naveen Manjunath, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/028,522

(22) Filed: Jul. 6, 2018

(65) Prior Publication Data

US 2018/0316679 A1 Nov. 1, 2018

Related U.S. Application Data

(63) Continuation of application No. 14/530,371, filed on Oct. 31, 2014, now Pat. No. 10,021,102.

(51) Int. Cl.
*H04L 29/06* (2006.01)
*H04L 29/08* (2006.01)

(52) U.S. Cl.
CPC .............. *H04L 63/10* (2013.01); *H04L 67/10* (2013.01); *H04L 67/28* (2013.01)

(58) Field of Classification Search
CPC ......... H04L 67/14; H04L 67/10; H04L 67/42; H04L 63/10
USPC ........................................................ 709/203
See application file for complete search history.

(56) References Cited

U.S. PATENT DOCUMENTS

| 6,993,591 | B1 | 1/2006 | Klemm | |
| 7,895,231 | B2* | 2/2011 | Patterson | ............ H04L 67/1036 707/609 |
| 7,984,500 | B1 | 7/2011 | Khanna et al. | |
| 8,024,471 | B2 | 9/2011 | Sinclair et al. | |
| 8,141,147 | B2 | 3/2012 | Sinclair et al. | |
| 8,204,933 | B2 | 6/2012 | Wei et al. | |
| 8,205,258 | B1* | 6/2012 | Chang | ................... G06F 21/566 726/22 |

(Continued)

*Primary Examiner* — Vivek Srivastava
*Assistant Examiner* — Binod J Kunwar
(74) *Attorney, Agent, or Firm* — Hewlett Packard Enterprise Patent Department

(57) ABSTRACT

The present disclosure discloses a system and method for classifying an application session for forwarding or refrain from forwarding to a client. Generally, classifying an application session includes: receiving a first request from a client device at a first network device; transmitting, by the first network device, a second request to obtain classification information corresponding to the first request; forwarding, by the first network device, the first request from the client device prior to receiving the classification information corresponding to the first request; receiving, by the first network device, the classification information corresponding to the first request; receiving, by the first network device, a first response corresponding to the forwarded first request; and based on the classification information, forwarding or refraining from forwarding the first response to the client device.

19 Claims, 8 Drawing Sheets

(56) References Cited

U.S. PATENT DOCUMENTS

| | | | |
|---|---|---|---|
| 8,615,800 B2 * | 12/2013 | Baddour | H04L 63/1441 |
| | | | 726/22 |
| 8,972,376 B1 * | 3/2015 | Gailis | G06F 16/951 |
| | | | 707/710 |
| 9,172,649 B2 * | 10/2015 | Sampath | H04N 21/643 |
| 9,331,981 B2 | 5/2016 | Jiang et al. | |
| 9,378,282 B2 * | 6/2016 | Hubbard | G06F 16/951 |
| 9,467,421 B2 | 10/2016 | Xie | |
| 9,503,499 B1 | 11/2016 | Donaldson | |
| 2001/0037400 A1 | 11/2001 | Raz | |
| 2004/0199606 A1 | 10/2004 | Brown et al. | |
| 2005/0246410 A1 | 11/2005 | Chen et al. | |
| 2006/0075072 A1 | 4/2006 | Sinclair | |
| 2006/0080405 A1 | 4/2006 | Gibson | |
| 2008/0010683 A1 | 1/2008 | Baddour et al. | |
| 2008/0104113 A1 | 5/2008 | Wong et al. | |
| 2008/0109452 A1 * | 5/2008 | Patterson | H04L 67/1012 |
| 2008/0209057 A1 | 8/2008 | Martini et al. | |
| 2010/0115615 A1 | 5/2010 | Hubbard | |
| 2010/0161787 A1 | 6/2010 | Jones | |
| 2010/0205239 A1 | 8/2010 | Greiner | |
| 2010/0274836 A1 | 10/2010 | Orentas et al. | |
| 2011/0185436 A1 | 7/2011 | Koulinitch et al. | |
| 2012/0036263 A1 | 2/2012 | Madden et al. | |
| 2013/0298254 A1 | 11/2013 | Hall et al. | |
| 2013/0332443 A1 | 12/2013 | Opalinski et al. | |
| 2014/0298445 A1 * | 10/2014 | Jiang | H04L 67/02 |
| | | | 726/13 |
| 2014/0379841 A1 * | 12/2014 | Zong | H04L 67/02 |
| | | | 709/213 |
| 2015/0188948 A1 | 7/2015 | Song et al. | |
| 2015/0254469 A1 | 9/2015 | Butler | |

* cited by examiner

LEAK-PROOF CLASSIFICATION FOR AN APPLICATION SESSION

CROSS REFERENCE TO RELATED APPLICATION

This application is a continuation of co-pending U.S. patent application Ser. No. 14/530,371, filed Oct. 31, 2014, the entire contents of which are hereby incorporated by reference as though fully set forth herein.

FIELD

The present disclosure relates to identifying and classifying an application session. In particular, the present disclosure relates to prioritizing classification of an application session and dynamically classifying the application session to minimize leak of data packets of the application session to a client.

BACKGROUND

When a client device requests access to application data over a network, this access request may or may not be granted. Theoretically the client device can receive the requested application data only if the access request is granted, i.e., the application has been classified to be allowed. However, since classification of the application needs time, it often happens that data packets of a to-be-denied application have been leaked to the client device when the classification of the application is still on-going.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
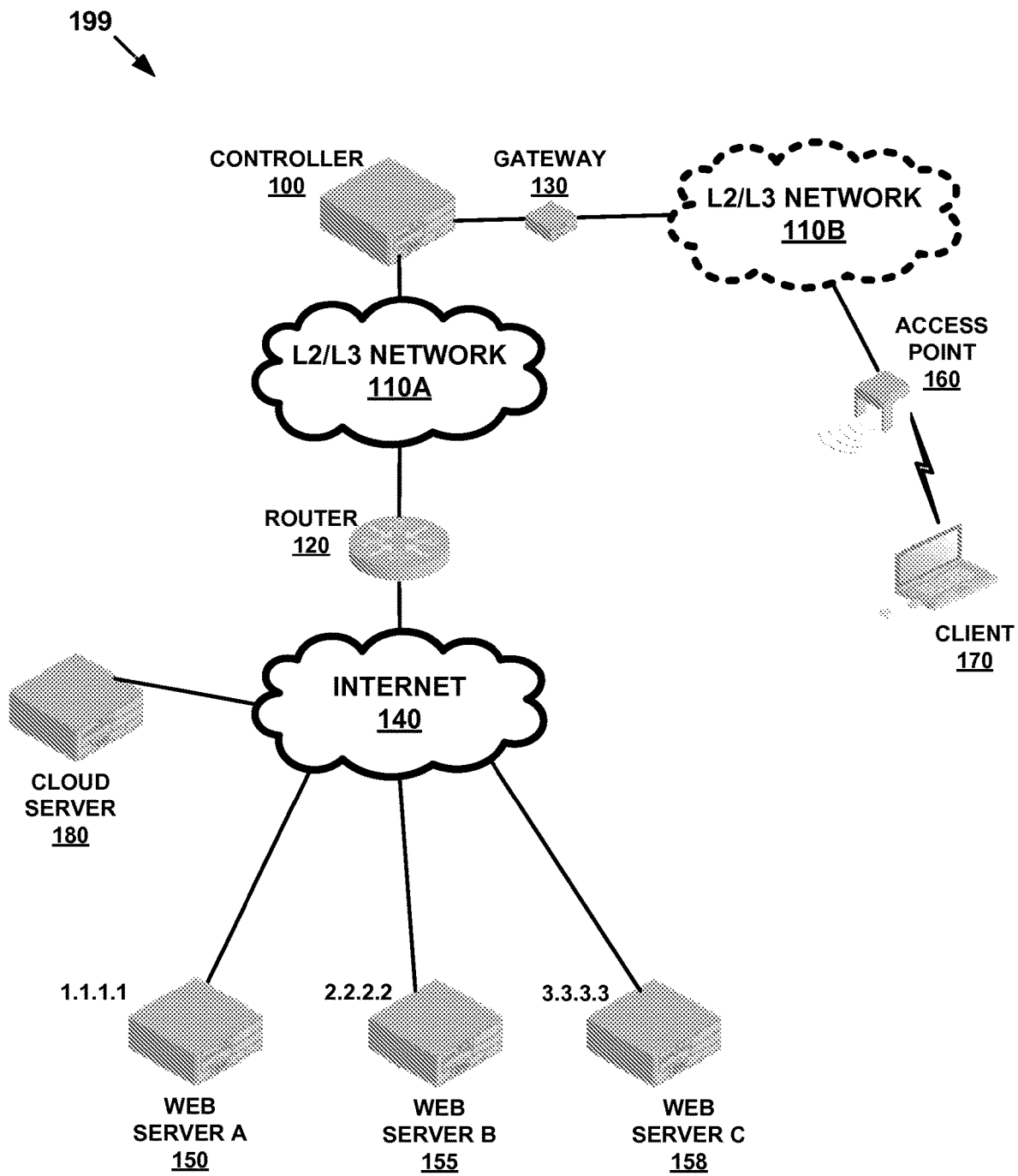
FIG. 1 is a block diagram illustrating an example network environment according to embodiments of the present disclosure.

In the following description, several specific details are presented to provide a thorough understanding. While the context of the disclosure is directed to task processing and resource sharing in a distributed wireless system, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Some embodiments of the present disclosure relates to classifying an application session for forwarding or refraining from forwarding. Generally, classifying an application session includes: receiving a first request from a client device at a first network device; transmitting, by the first network device, a second request to obtain classification information corresponding to the first request; forwarding, by the first network device, the first request from the client device prior to receiving the classification information corresponding to the first request; receiving, by the first network device, the classification information corresponding to the first request; receiving, by the first network device, a first response corresponding to the forwarded first request; and based on the classification information, forwarding or refraining from forwarding the first response to the client device.

In such embodiments, the classification information is received prior to receiving the first response or the first response is received prior to receiving the classification information. In such embodiments, the classifying also includes using a first priority for transmitting the second request that is higher than a second priority used for forwarding the first request. In such embodiments, the classifying also includes based on the classification information, forwarding the first response to the client device. In such embodiments, the classifying also includes based on the classification information, refraining from forwarding the first response to the client device. In such embodiments, the classifying further includes redirecting the client device to a particular webpage that is different than a webpage corresponding to the first request In some embodiments, classifying an application session includes: receiving a first request from a client device at a first network device; transmitting, by the first network device, a second request to obtain classification information corresponding to the first request; forwarding, by the first network device, the first request from the client device prior to receiving the classification information corresponding to the first request; receiving, by the first network device, a first response corresponding to the forwarded first request prior to receiving the classification information; and responsive to receiving the first response prior to receiving the classification information, at least temporarily refraining from forwarding the first response to the client device. In such embodiments, the classifying also includes dropping the first response without forwarding the first response to the client device. In such embodiments, the classifying also includes: subsequent to receiving the classification information, forwarding the first response to the client device. In such embodiments, the classifying also includes: receiving a second request from the client device; receiving the classification information for the first request subsequent to receiving the second request from the client device; and based on the classification information, forwarding the first response to the client device in response to the second request from the client device. In such embodiments, the classifying further includes modifying the first response to match attributes of the second request prior to forwarding the first response to the client device in response to the second request.

In some embodiments, classifying an application session includes: receiving, at a first network device from a client device, a request for a first webpage; obtaining classification information for the first webpage; and based on the classification information, transmitting the first webpage to the client device or redirecting the client device to a second webpage. In such embodiments, the classifying also includes based on the classification information, transmitting the first webpage to the client device or redirecting the client device to a captive portal.

Computing Environment

FIG. 1 shows an example digital network environment 199 according to embodiments of the present disclosure. FIG. 1 includes at least one or more network controller (such as controller 100), one or more access points (such as access point 160), one or more client devices (such as client 170), a layer 2 or layer 3 network 110, a routing device (such as router 120), a gateway 130, Internet 140, one or more web servers (such as web server A 150, web server B 155, and web server C 158), and one or more cloud servers (such as cloud server 180), etc. The components of the digital network environment 199 are communicatively coupled to each other. In some embodiments, the digital network environment 199 may include other components not shown in FIG. 1 such as an email server, a thirty-party server, etc. It is intended that any of the servers shown may represent an email server or a third-party server instead as illustrated with emailing functionality or other functionalities. The network 140 may be implemented within a cloud environment.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc. In some embodiments, the controller 100 is an optional component in the digital network environment 199.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B.

Wired interfaces typically include IEEE 802.3 Ethernet interfaces, used for wired connections to other network devices such as switches, or to a controller. Wireless interfaces may be WiMAX, 3G, 4G, and/or IEEE 802.11 wireless interfaces. In some embodiments, controllers and APs may operate under control of operating systems, with purpose-built programs providing host controller and access point functionality.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100. In some embodiments, the gateway 130 is an optional component in the digital network environment 199.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

The cloud server 180 may be hardware devices and/or software modules that provide cloud services for the client 170 via the Internet 140. In some embodiments, the cloud server 180 communicates with the web servers 150, 155, 158 and the client 170 to provide cloud-based filtering. For example, the cloud server 180 provides cloud-based web filtering by determining whether to permit or deny an application session for the client 170 accessing a website hosted by the web server 150, 155 or 158. The cloud-based web filtering is described below in more detail with reference to FIGS. 2-7.

Network Device for Leak-Proof Classification Application

Figure 2:
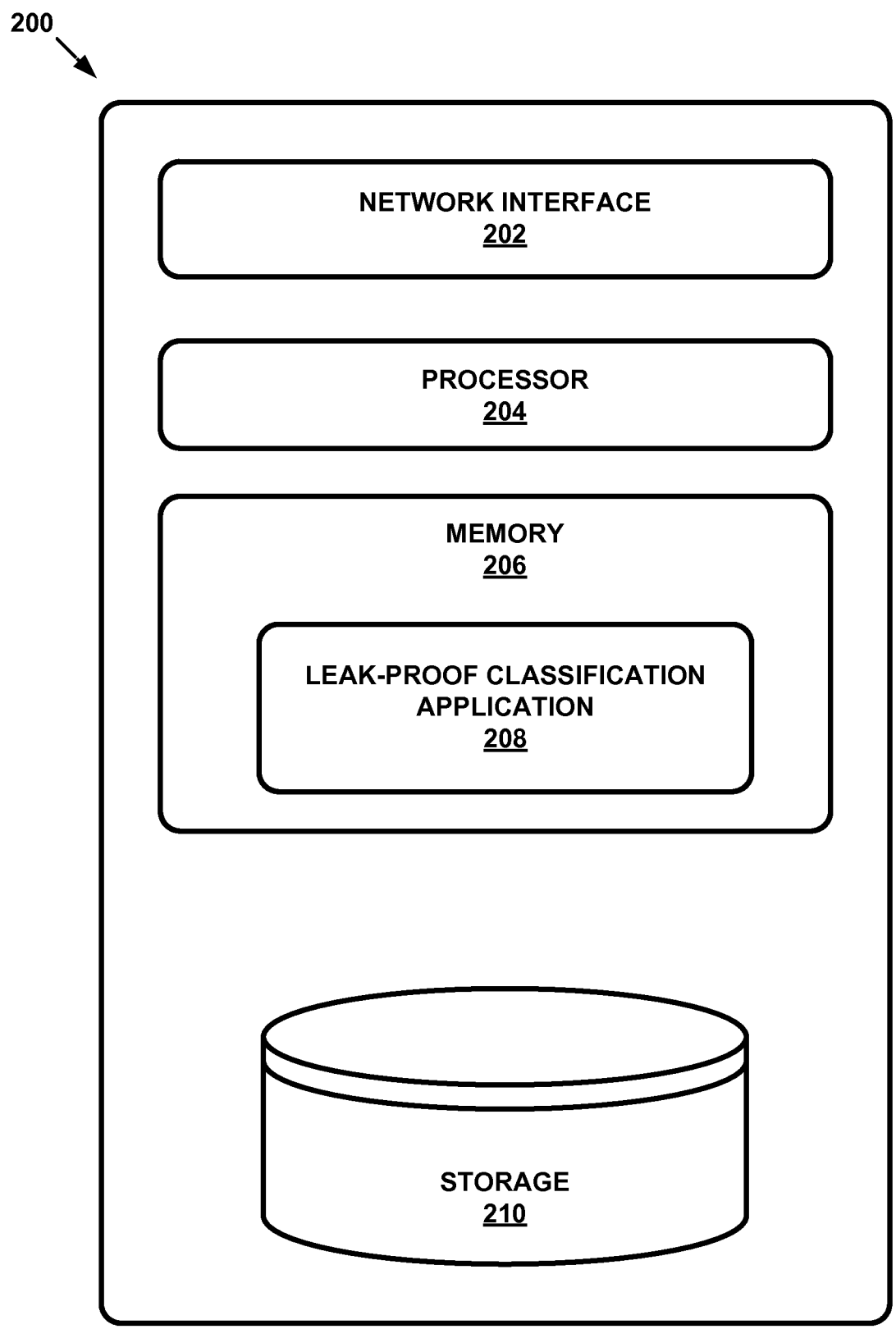
FIG. 2 is a block diagram illustrating an example network device according to embodiments of the present disclosure.

FIG. 2 is a block diagram illustrating an example network device system 200 for classifying an application session according to embodiments of the present disclosure. The network device 200 may be used as a network switch, a network router, a network controller, a cloud server, an access point, etc. Further, the network device 200 may serve as a node in a distributed or a cloud computing environment.

According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device or system 200 may serve as a node in a distributed or a cloud computing environment.

In some embodiments, the network device 200 includes a network interface 202 capable of communicating to a wired network, a processor 204, a memory 206 and a storage device 210. The components of the network device 200 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a leak-proof classification application 208. The leak-proof classification application 208 can be the code and routines that, when executed by processor 204, cause the network device 200 to implement classifying an application session. In some embodiments, a node can be a cloud server 180. In some other embodiments, a node can be a controller 100, a router 120, a gateway 130, a switch or any other network device. In some embodiments, the leak-proof classification application 208 can be located in a cloud server 180. In some other embodiments, the leak-proof classification application 208 can be located in a controller 100, a router 120, a gateway 130, a switch or any other network device. In some embodiments, the leak-proof classification application 208 can be implemented using hardware including a Field-Programmable Gate Array (FPGA) or an Application-Specific Integrated Circuit (ASIC). In some other embodiments, the leak-proof classification application 208 can be implemented using a combination of hardware and software. In some embodiments, the leak-proof classification application 208 may be stored in a combination of the network devices, or in one of the network devices. The leak-proof classification application 208 is described below in more detail with reference to FIGS. 3-7.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Leak-Proof Classification Application

Figure 3:
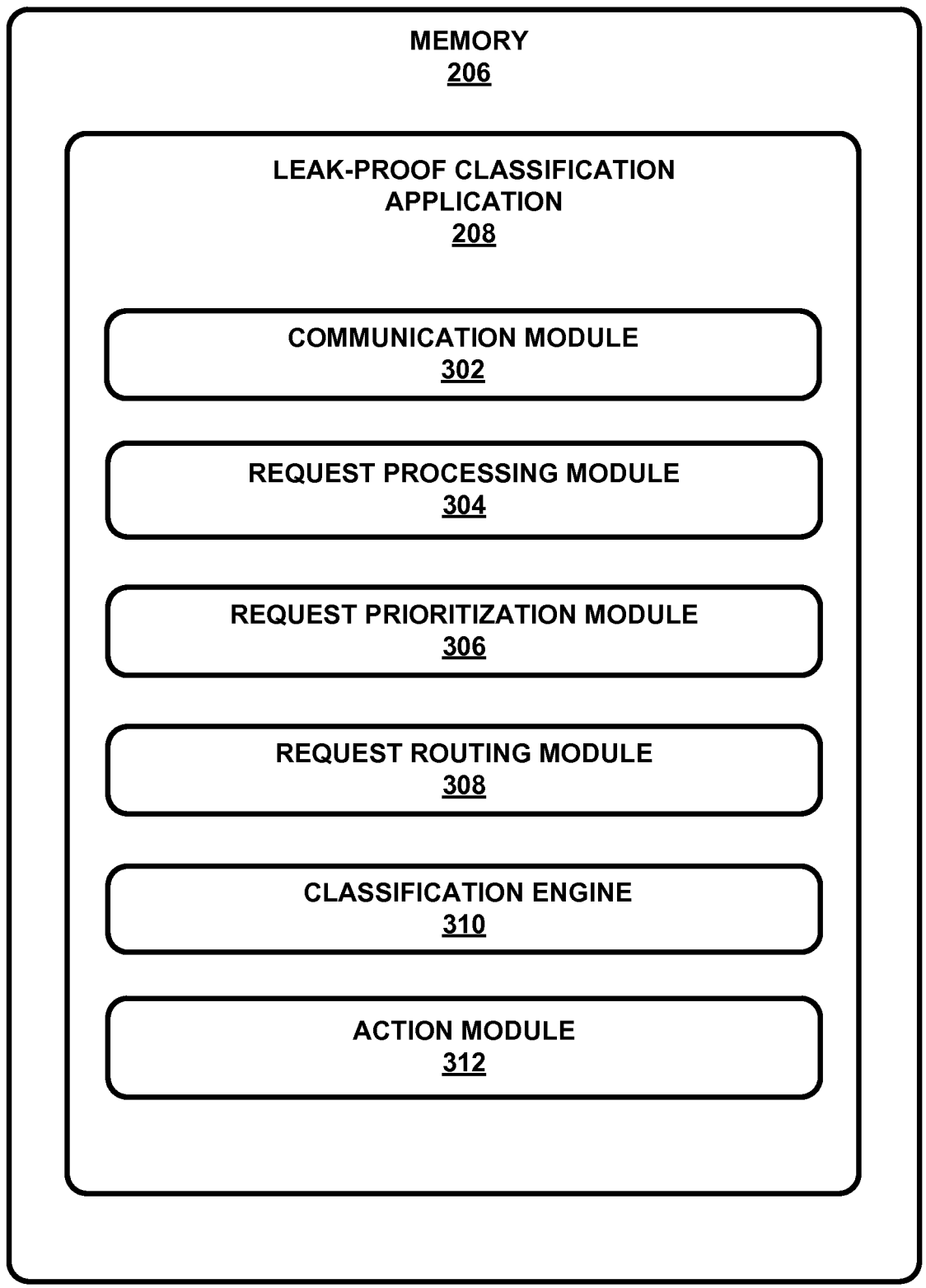
FIG. 3 is a block diagram illustrating an example leak-proof classification application according to some embodiments of the present disclosure. The application is stored on a memory of the example network device or system.

FIG. 3 illustrates an example leak-proof classification application 208 stored on a memory 206 according to embodiments of the present disclosure. In some embodiments, the leak-proof classification application 208 includes a communication module 302, a request processing module 304, a request prioritization module 306, a request routing module 308, a classification engine 310 and an action module 312.

The leak-proof classification application 208 can be software including routines for classifying an application session for forwarding or refraining from forwarding. In some embodiments, the leak-proof classification application 208 can be a set of instructions executable by the processor 204 to provide the functionality described herein. In some other embodiments, the leak-proof classification application 208 can be stored in the memory 206 and can be accessible and executable by the processor 204.

The leak-proof classification application 208 identifies an application session when a client requests access to an application, analyzes data packets of the application session, classifies the application session into a category, and forwards or refrains from forwarding a response to the client that requested the access to the application. For example, the client 170 sends a request for accessing a webpage of a website hosted by the webserver 150. The leak-proof classification application 208 classifies the webpage associated with a web address into a category, and permits or denies the client 170 to access this webpage according to the category.

Responsive to receiving a request from the client 170 to access a webpage of a website hosted by the webserver 150, 155 or 158, the leak-proof classification application 208 generates classification information corresponding to the request and the web servers 150, 155 or 158 generates a response including the webpage data. If the leak-proof classification application 208 generates the classification information before the response is actually sent to the client 170, the leak-proof classification application 208 uses the classification information to determine if actually forwarding the response to the client 170 (since the response could be denied). In some embodiments, the leak-proof classification application 208 prioritizes the classification procedure in order to increase the probability that the leak-proof classification application 208 can timely generate and use the classification information in determining whether to allow the response before the response is actually sent to the client 170.

When the leak-proof classification application 208 cannot generate the classification information before the response is actually sent to the client 170, the leak-proof classification application 208 will temporarily refrain from forwarding the response to the client 170. As a result, no data packets of the application will be leaked to the client 170 when the leak-proof classification application 208 is still classifying the application.

The leak-proof classification application 208 dynamically classifies an application session. For example, the leak-proof classification application 208 receives two requests for the same webpage from a client. The leak-proof classification application 208 may allow a first response corresponding to a first request and deny a second response corresponding to a second request. It may be because the bandwidth that the client had consumed exceeded a threshold or the webpage became high-risky due to computer virus spread after the first request was received and before the second request was received.

The leak-proof classification application 208 classifies an application session. Although the following description is mainly based on web applications for ease of understanding, one skilled in the art will recognize that the application session can include other applications such as an email session, an online conversation session, etc.

The communication module 302 can be software including routines for handling communications between the leak-proof classification application 208 and other components in the digital computing environment 199 (FIG. 1). In some embodiments, the communication module 302 can be a set of instructions executable by the processor 204 to provide the functionality described herein. In some other embodiments, the communication module 302 can be stored in the memory 206 of the leak-proof classification application 208 and can be accessible and executable by the processor 204.

In some embodiments, the communication module 302 may be adapted for cooperation and communication with the processor 204 and other components of the leak-proof classification application 208 such as the network interface 202, the storage 210, etc.

In some embodiments, the communication module 302 sends and receives data to and from one or more of a client 170 (FIG. 1), an access point 160 (FIG. 1) and other network devices via the network interface 202 (FIG. 2), in the event of distributed functionalities. In some embodiments, the communication module 302 handles communications between components of the leak-proof classification application 208. In some embodiments, the communication module 302 receives data from other components of the leak-proof classification application 208 and stores the data in the storage device 210.

The request processing module 304 can be software including routines for processing a first request and generating a second request based on the first request. In some embodiments, the request processing module 304 can be a set of instructions executable by the processor 204 to provide the functionality described herein. In some other embodiments, the request processing module 304 can be stored in the memory 206 of the leak-proof classification application 208 and can be accessible and executable by the processor 204.

In some embodiments, the request processing module 304 receives a first request from the client 170. The first request is for obtaining application data. For example, the first request is for obtaining data from a website hosted by the web server 150, 155 or 158. The first request may request for opening a webpage of the website, downloading a movie from the website, receiving a list of reviews for a product from the website, etc.

Responsive to receiving the first request, the request processing module 304 processes the first request and generates a second request based on processing the first request. The second request is for obtaining classification information corresponding to the first request. In some embodiments, the request processing module 304 analyzes packets of the first request, extracts data from the packets and generates a second request based on the extracted data. For example, the request processing module 304 extracts a web address such as a Hypertext Transfer protocol (http) address from packets of the first request and generates a second request to include the web address. The classification information is then used to determine whether to provide a client access to the requested data. For example, the classification information is used to determine whether to allow the client 170 to receive a response from the web address included in the second request. The response includes data required by the client 170 in the first request, for example, a webpage, a movie or a list of reviews, etc. The classification information will be described in detail below with reference to the classification engine 310.

The request prioritization module 306 can be software including routines for assigning a priority to a request. In some embodiments, the request prioritization module 306 can be a set of instructions executable by the processor 204 to provide the functionality described herein. In some other embodiments, the request prioritization module 306 can be stored in the memory 206 of the leak-proof classification application 208 and can be accessible and executable by the processor 204.

The request prioritization module 306 receives the first request and the second request from the request processing module 304 and assigns different priorities to the first request and the second request. In some embodiments, the request prioritization module 306 assigns a first priority to the second request by putting the second request in a high priority queue. The request prioritization module 306 assigns a second priority to the first request by putting the second request in a low priority queue. The first priority is higher than the second priority. Therefore, the second request for obtaining the classification information has a head start to be handled while the first request for obtaining application data (e.g., from a website) is delayed relative to the second request.

The request routing module 308 can be software including routines for routing the first and second requests based on associated priorities. In some embodiments, the request routing module 308 can be a set of instructions executable by the processor 204 to provide the functionality described herein. In some other embodiments, the request routing module 308 can be stored in the memory 206 of the leak-proof classification application 208 and can be accessible and executable by the processor 204.

The request routing module 308 receives the first and second requests and routes the first and second requests to corresponding servers, engines and/or modules. In some embodiments, the request routing module 308 forwards the first request for obtaining application data to a remote server. For example, the request routing module 308 forwards the first request for obtaining data from a website to the web server 150, 155 or 158 that hosts the website. The request routing module 308 also transmits the second request for obtaining classification information corresponding to the first request to the classification engine 310 that generates the classification information.

In addition to the first and second requests, the request routing module 308 also receives the priorities assigned to the first and second requests from the request prioritization module 306, and as a result, routes the first and second requests at different time points determined by their respective priorities. Since the first priority associated with the second request is higher than the second priority associated with the first request, the request routing module 308 transmits the second request to the classification engine 310 before forwarding the first request to a remote server such as the web server 150, 155 or 158. The time difference between routing the first and second requests serves as a bonus time for the classification engine 310 to generate and transmit the classification information. This is beneficial to leak-proof data transmission to the client 170.

Assume that the web server 150, 155 or 158 generates a response that responds the first request at time T0. Assume that the classification engine 310 generates the classification information for the first request at time T1. T1 is greater than T0. Also assume that the client 170 can receive the response or the classification information at the time they are generated by ignoring any delays caused by network traffic or other factors. Without the priority assignment, the client 170 will receive the response from the web server 150, 155 or 158 at T0 when the classification is still on-going since the classification engine 310 needs a time longer than T0 (i.e., T1) to generate the classification information. Even if at time T1 the classification information is received at the client 170 and indicates that the response from the web server 150, 155 or 158 should be denied, packets of the response have already been sent to the client 170 within time interval T1-T0. Packets leak therefore occurs when the client 170 received data that was not supposed to receive. With the priority assignment, the classification engine 310 starts the classification for the first request T2 earlier and generates the classification information T2 earlier, i.e., at T1-T2. If T1-T2 is less than T0, the classification information will be received at T1-T2, which is earlier than the time T0 when any action will be performed on the response. The action could be a rejection or a permission of the response to the client 170 determined based on the classification information. Since no false action regarding the response is performed, the client 170 will not receive any leaked packets of a rejected response.

On the one side, based on the priorities, the request routing module 308 transmits the second request to the classification engine 310 for obtaining classification information prior to forwarding the first request to a remote server for requesting application data. On the other side, the request routing module 308 also forwards the first request to the remote server prior to receiving the classification information. The earliest time that a client can actually receive the requested data is the time when both the requested data and the classification information that allows the client's access to the requested data are available. Thus there is no need for the request routing module 308 to wait until the classification information is available and then forward the first request to the remote server for obtaining the requested data, which can only delay the earliest time that the client may actually receive the requested data.

The classification engine 310 can be software including routines for generating classification information corresponding to a request. In some embodiments, the classification engine 310 can be a set of instructions executable by the processor 204 to provide the functionality described herein. In some other embodiments, the classification engine 310 can be stored in the memory 206 of the leak-proof classification application 208 and can be accessible and executable by the processor 204.

Responsive to receiving the second request from the request routing module 308, the classification engine 310 generates classification information corresponding to the first request. The first request is for obtaining application data and the second request is for obtaining the classification information corresponding to the first request. For example, the first request for obtaining data from a website hosted by the web server 150, 155 or 158. The second request includes a web address of the website extracted from the first request. The classification engine 310 receives the second request and generates the classification information corresponding to the web address.

In some embodiments, the classification information includes at least a category that the web address belongs to. Based on the category, a response from the web address will be allowed or denied for transmission to the client that requested the response. In some embodiments, the category also indicates that a response from the web address will be allowed to send to the client, but with limited bandwidth (e.g., throttled). For example, if the total amount of video downloaded from a web address by a client exceeds a threshold value in the morning, the classification engine 310 may categorize the web address as throttled such that limited responses from the web address will be sent to the client in the rest of the day. Therefore the client may only receive movie clips instead of a full movie in the afternoon. In another example, if many clients request data from a same website (e.g., a new medical care website) at the same time, the classification engine 310 may categorize the website as throttled. A response will then be provided to each client with limited bandwidth. As a result, each client will receive certain amount of information and the website will less likely to get overloaded.

In some embodiments, the classification engine 310 generates the classification information corresponding to a web address based on reputation of the website associated with the web address. The reputation is represented by a value within a predetermined range, for example, 0 to 100. For example, a high-risk website may have a reputation value 10 while a low-risk website may have a reputation value 70.

In some embodiments, the classification engine 310 receives reputation information of a website from a third-party server (not shown) and determines a reputation value based on the received information. For example, the classification engine 310 communicates with the communication module 302 to receive a list of websites that provide the best language translation service. As a result, the classification engine 310 assigns a high reputation value to each website on the list.

In other embodiments, the classification engine 310 also determines a reputation value for a website based on information regarding previous interactions with the website. For example, the classification engine 310 receives response time of two search websites in the past two weeks and determines that the search website with a longer average response time have a lower reputation value. In another example, the classification engine 310 receives information that the number of users visiting a website continuously increases in the past six month and assigns a high reputation value to the website. Although the classification engine 310 determines a reputation value for a website based on either the response time or the number of visitors in the above examples, one skilled in the art will recognize that the classification engine 310 can aggregate information regarding different aspects of a website (e.g., a response time of the website, the number of users visiting the website, the number of reviews for the website, a percentage of bad/good reviews for the website, the number of users that recommend the website, the number of attacks to the website, etc.) and determine a reputation value for the website based on the aggregated information.

In some other embodiments, the classification engine 310 adjusts the reputation value of a website based on received information (e.g., reputation information or previous interactions). For example, the classification engine 310 receives information that a website was attacked and accordingly decreases the reputation value of the website. In another example, the classification engine 310 assigned a high reputation value for a new online store based on user feedback in the first couple of days. The user feedback showed that many users liked the free-shipping policy of the store. However, after the products were delivered to users, most of the new user feedback are complains about the poor quality of products sold in the store. As a result, the classification engine 310 decreases the reputation value of the store. In some embodiments, the classification engine 310 adjusts the reputation value in real time. As in the above examples, the classification engine 310 would decrease the reputation value of the websites as long as it receives the attack information or new user feedback.

Once the reputation value for a website is determined, the classification engine 310 classifies the website into a category. For example, the classification engine 310 generates classification information to allow access to a first website associated with a high reputation value (e.g., a popular website), to deny access to a second website associated with a low reputation value (e.g., a spam website), and to allow access with limited bandwidth to a third website associated with a medium reputation value (e.g., a crowed online store that is on annual sale).

In some embodiments, the classification engine 310 determines to which category that a website belongs based on comparing the reputation value and a threshold. In some embodiments, the threshold is a predetermined value. For example, the classification engine 310 determines to allow access to a website if the reputation value of the website exceeds a threshold value. Otherwise, the classification engine 310 would deny the access to the website. In other embodiments, the threshold includes at least one range. When the reputation value associated with a website falls within a particular range, the classification engine 310 classifies the website into the category corresponding to the particular range. For example, the classification engine 310 determines to allow access with limited bandwidth to a website if the reputation value of the website is between 40 and 60.

The classification procedure described herein is advantageous because the classification engine 310 dynamically determines the category that a website belongs to. Current filtering such as application level filtering based on access control lists (ACLs) is static. For example, responsive to receiving a request for obtaining data from a website, an access point currently uses the five-tuple rules to determine, from the request, a source Internet Protocol (IP) address, a destination IP address, a source Media Access Control (MAC) address, a destination MAC address and a port number corresponding to a protocol. The access point then uses the ACLs to determine whether to allow the data flow that IP address A sends to IP address B through protocol C. No matter when and how many requests for the data flow using A, B and C are received, the access point takes the same action on the data flow using A, B and C, i.e., either always allows or always denies the access to the website. Unless the ACLs is manually changed by an administrator and is used to filter the data flow in a different way, such application level filtering using ACLs is static.

On the contrary, the classification engine 310 may classify the data flow to the same website into different categories responsive to receiving different requests for the data flow. The classification engine 310 dynamically determines the category for a website because it determines a dynamic reputation value for the website. For example, the client 170 starts routine news search from a website hosted by the web server 155 on Monday morning and Tuesday morning. Responsive to receiving the request on Monday morning, the classification engine 310 may categorize the website as allowed and cause the news to be presented on the browser of the client 170. However, since the website was hacked on Monday afternoon and became malicious, the classification engine 310 decreased the reputation value of the website. As a result, the classification engine 310 may categorize the website as denied responsive to receiving the client's request on Tuesday morning, which causes an error message instead of the news to be sent to the browser of the client 170.

The classification procedure described herein has additional advantages. Currently, if access to a website is denied, every http connection that corresponds to every webpage on this website will all be blocked. The classification engine 310 generates classification information corresponding to a web address of a website. This is URL level filtering based on every http connection (e.g., every webpage) instead of the whole website. Therefore when the classification engine 310 determines to deny access to a first webpage corresponding to a first web address of a website, the classification engine 310 may also allow access to a second webpage corresponding to a second web address of the website. For example, the classification engine 310 may allow a client to access a user profile page but prevent the client from accessing the user's pictures posted on a different webpage of the same website. In another example, the classification engine 310 allows a client to access free webpages of a website (e.g., movie posters) and denies the access to other webpages that are not free (e.g., movies).

The action module 312 can be software including routines for determining an action to be performed on a response corresponding to a request and perform the action. In some embodiments, the action module 312 can be a set of instructions executable by the processor 204 to provide the functionality described herein. In some other embodiments, the action module 312 can be stored in the memory 206 of the leak-proof classification application 208 and can be accessible and executable by the processor 204.

The request routing module 308 forwards a first request from the client 170 to the web server 150, 155 or 158. The first request is for obtaining data from the website hosted by the web server 150, 155 or 158. The web server 150, 155 or 158 generates a response corresponding to the forwarded first request. The action module 312 receives this response from the web server via the communication module 302.

The request routing module 308 also transmits, to the classification engine 310, a second request for obtaining classification information corresponding to the first request.

The classification engine 310 generates the classification information responsive to the second request and transmits the classification information to the action module 312.

The action module 312 identifies the time when the classification information was received and the time when the response was received. For example, the action module 312 identifies respective receiving time for the classification information and the response based on time stamps included in the data packets of the classification information and the response. The action module 312 then determines an action to be performed on the response based on the receiving time and the classification information.

In the first scenario, the action module 312 has received the classification information before receiving the response. Therefore when the action module 312 determines which action to be performed on the response at the time the action module 312 receives the response, the response has already been classified. The action module 312 determines an action on the response based on the classification information. If the classification information indicates that the response is categorized as allowed or throttled, the action module 312 forwards the response to the client. By forwarding the response, the action module 312 sends the packets of the response back to the client 170 normally or sends certain packets of the response back to the client (e.g., only text version of a webpage instead of graphic version of the webpage). If the classification information indicates that the response is categorized as denied, the action module 312 refrains from forwarding the response to the client. In this case, the action module 312 may convert the response to an error message stating that "this website is denied as per policy" and send the error message back to the client to cause the error message to be presented on the browser of the client.

In the second scenario, the action module 312 has received the response before receiving the classification information. Therefore when the action module 312 determines which action to be performed on the response at the time the action module 312 receives the response, the action module 312 cannot rely on the classification information for an action decision. In this case, the action module 312 will temporarily refrain from forwarding the response to the client to avoid any packets leak to the client. In other words, the action module 312 will not send the response back to the client before receiving the classification information even if this response is turned out to be allowable at last.

In some embodiments, the action module 312 refrains from forwarding the response to the client by dropping the response packets. The client therefore will not receive the response unless the client sends the original request (e.g., the first request) again. Depending on the protocol used in transmitting the request, the retry of the request upon failing to receive the corresponding response is sometimes automatic. For example, a client sends a request using Transmission Control Protocol (TCP). When the client receives time out information instead of the response for this request, the request processing module 304 will receive this request again without intervening from the client.

In other embodiments, the action module 312 refrains from forwarding the response to the client by sending a refresh page to the client for retransmitting the original request. For example, the action module 312 converts the response to an html page with html syntax of <meta http-equiv="refresh" content="value"> and sends the html page to the client. The refresh page causes the browser of the client to refresh the original request after "value" seconds. Since the fresh page triggers the client to initiate a retransmission of the original request after a certain time, the classification engine 310 gains this certain time to generate the classification information. Therefore when the action module 312 receives the new response responding to the retransmitted request, it is more likely that the action module 312 has already received the classification information. As a result, the action module 312 can determine an action performed on the new response as in the first scenario described above.

Note when a client retransmits the original request for obtaining data from the website 150, 155 or 158, the website 150, 155 or 158 generates a new response responding to this retransmitted request and sends back this new response. The transmission of the new response causes extra bandwidth usage and may be problematic in heavy network traffic. To address this issue, in some embodiments, the action module 312 modifies the existing response as replacement of a new response responsive to receiving the transmitted request. Instead of dropping the response packets having received responsive to the first request (i.e., the original request), the action module 312 holds the data packets of the response. When the action module 312 receives the retransmission of the original request, the action module 312 modifies attributes of the response packets to match the retransmitted request. For example, the action module 312 may change the time stamp of the existing response to a later time based on the retransmitted request. The action module 312 may also change the session number of the existing response to match the new session number of the retransmitted request. Since no new response is generated, there is no extra bandwidth usage.

In some other embodiments, the action module 312 refrains from forwarding the response to the client by redirecting the client to a particular webpage that is different than the webpage in the response. In some embodiments, the action module 312 redirects the client to a webpage using captive portal technique. For example, the action module 312 redirects the client to an authentication webpage. If the client provides the correct credentials, the action module 312 will continue to determine which action to be performed on the response. Because of the delay of this authentication process, the action module 312 may now determine an action based on the classification information as in the first scenario. If the client fails to input the credentials, the action module 312 will drop the response. In another example, the action module 312 redirects the client to a webpage where the client gets charged. The action module 312 then determines which action to be performed on the response based not only on the classification information but also on whether the client pays. If the client does not pay, the client will not get the response.

When refraining from forwarding the response to the client the action module 312 may determine one refrain option from (1) dropping the response, (2) sending a refresh page and (3) redirecting the client to a different webpage. In some embodiments, the action module 312 determines a refrain option based on the web page requested by the client. For example, if the requested webpage is used for downloading a journal article, the action module 312 may direct the client to an authentication webpage to verify if the client is a member of a community. In another example, a client sends out ten requests requesting ten webpages from a website. The action module 312 determines to refrain from forwarding each response to the client. The action module 312 may send a refresh page to the client for each of the first nine responses. However, responsive to the tenth request, the action module 312 may redirect the client to a webpage that charges the client since the tenth webpage requested by the tenth request is not free. In other embodiments, the action module 312 also determines a refrain option based on other factors. For example, the action module 312 determines to temporarily refrain from forwarding a response to a first client and a second client responsive to receiving requests to a webpage of the website from each of the first and second clients. If the first client has interacted with a certain amount of webpages from the website and the second client accesses the website occasionally, the action module 312 may send a refresh page to the first client and redirect the second client to a different webpage that charges the second client.

In some embodiments, the action module 312 also facilitates the application session filtering by communicating with the access point 160 via the communication module 302. When the client 170 starts a web session by sending a request, the access point 160 receives the request and looks up its cache to determine if there is any information regarding whether to allow this web session. The information can include the category and reputation information about the web address included in the web session. If the access point 160 has such information in the cache, the access point 160 directly takes an action on the web session (e.g., denied or allowed) based on the information in the cache. If the access point 160 does not have such information stored in the cache, the access point 160 transmits a copy of the request via the communication module 302 to initiate the classification procedure implemented by modules and engines 304-312.

The access point 160 receives the category and reputation information from the action module 312. Once 304-310 has determined reputation information about a web address corresponding to a request and classified the web address into a category, the action module 312 notifies the access point 160 and sends the category and the reputation information to the access point 160 to store on the cache. Thus next time when a request for obtaining data from this web address is received, the access point 160 can directly take an action. In some embodiments, the information stored on the cache of the access point 160 expires based on timestamps associated with the information. In other embodiments, the action module 312 sends the updated information to the access point 160 and invalidates the information stored on the cache of the access point 160.

Processes for Detecting Wi-Fi Signatures from FFT Samples

Figure 4:
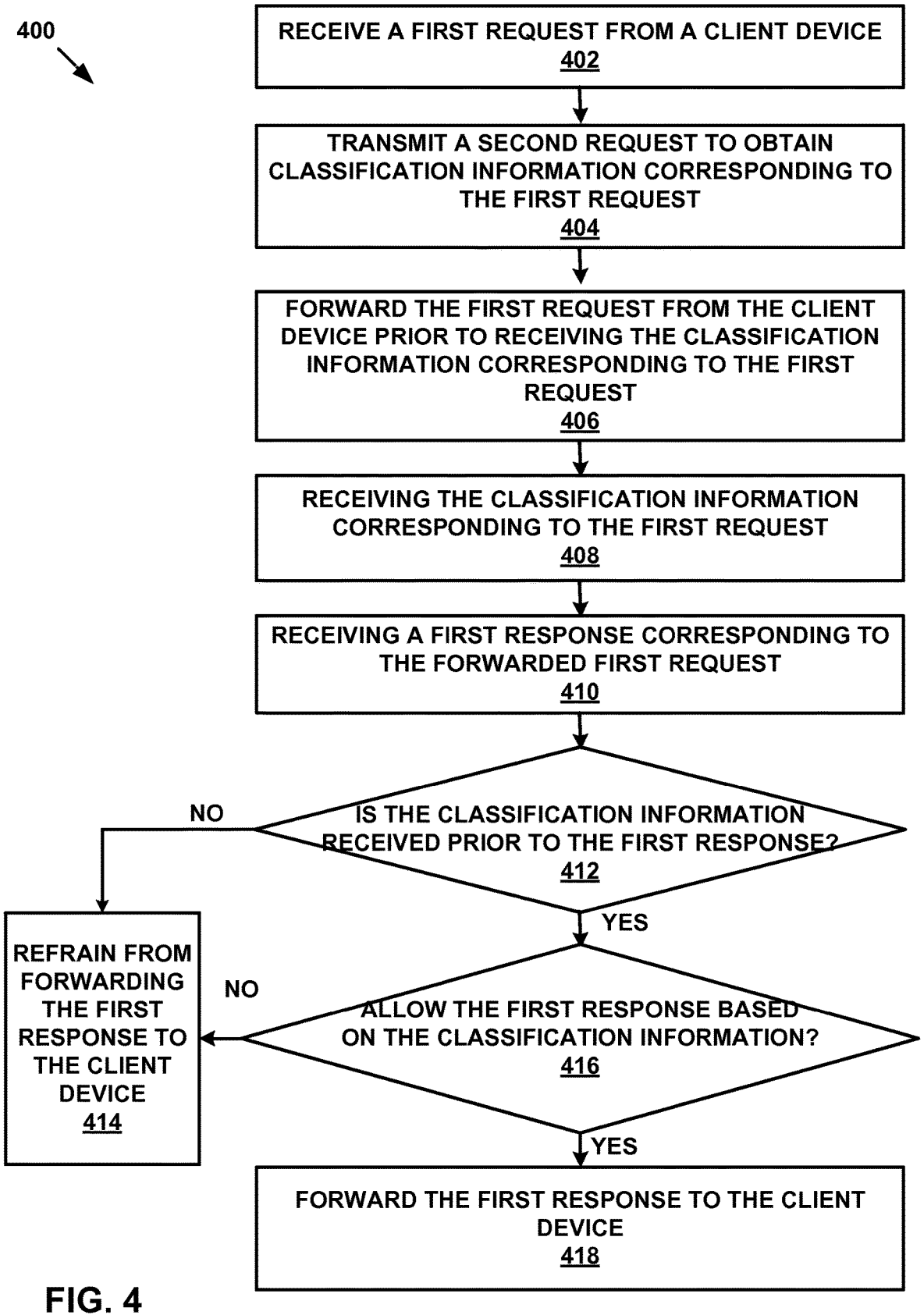
FIG. 4 illustrates an example process for classifying an application session for forwarding or refraining from forwarding to a client according to embodiments of the present disclosure.

FIG. 4 illustrates an example process 400 for classifying an application session for forwarding or refraining from forwarding to a client according to embodiments of the present disclosure. Process 400 begins with a first request from a client device being received (one or more operations indicated by block 402). A second request to obtain classification information corresponding to the first request is then transmitted (one or more operations indicated by block 404). The first request from the client device is forwarded prior to receiving the classification information corresponding to the first request (one or more operations indicated by decision block 406).

The classification information corresponding to the first request is received (one or more operations indicated by block 408). A first response corresponding to the forwarded first request is received (one or more operations indicated by block 410). If it is determined that the classification information is not received prior to the first response (412—No), then the first response is restrained from forwarding to the client device (one or more operations indicated by block 414). If it is determined that the classification information is received prior to the first response (412—Yes), a determination whether the first response should be allowed is made based on the classification information (one or more operations indicated by block 416). If it is determined that the first response should be denied based on the classification information (416—No), then the first response is restrained from forwarding to the client device (one or more operations indicated by block 414). If it is determined that the first response should be allowed based on the classification information (416—Yes), then the first response is forwarded to the client device (one or more operations indicated by block 418).

Figure 5A:
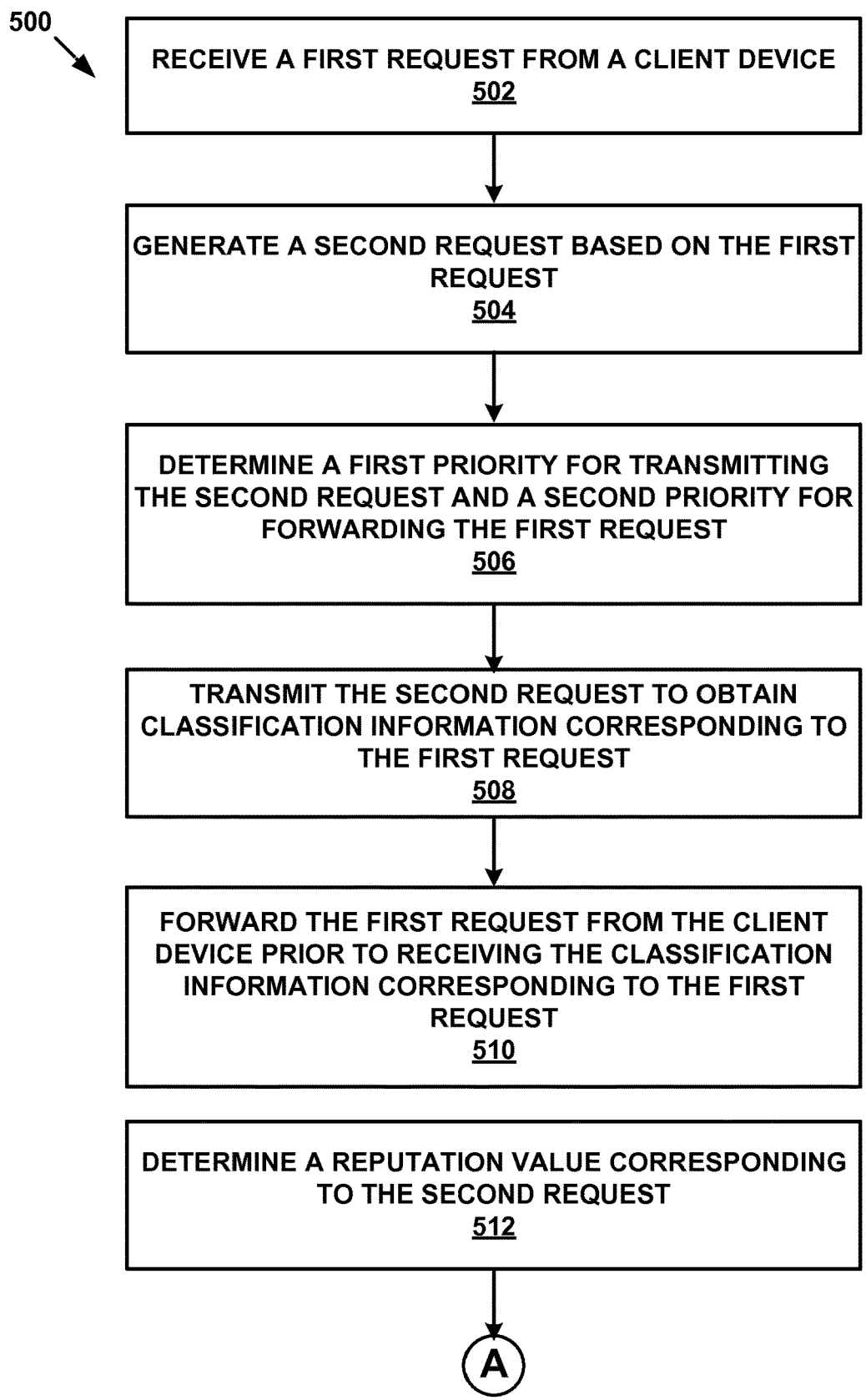
FIGS. 5A and 5B illustrate another example process for classifying an application session for forwarding or refraining from forwarding to a client according to embodiments of the present disclosure.
Figure 5B:
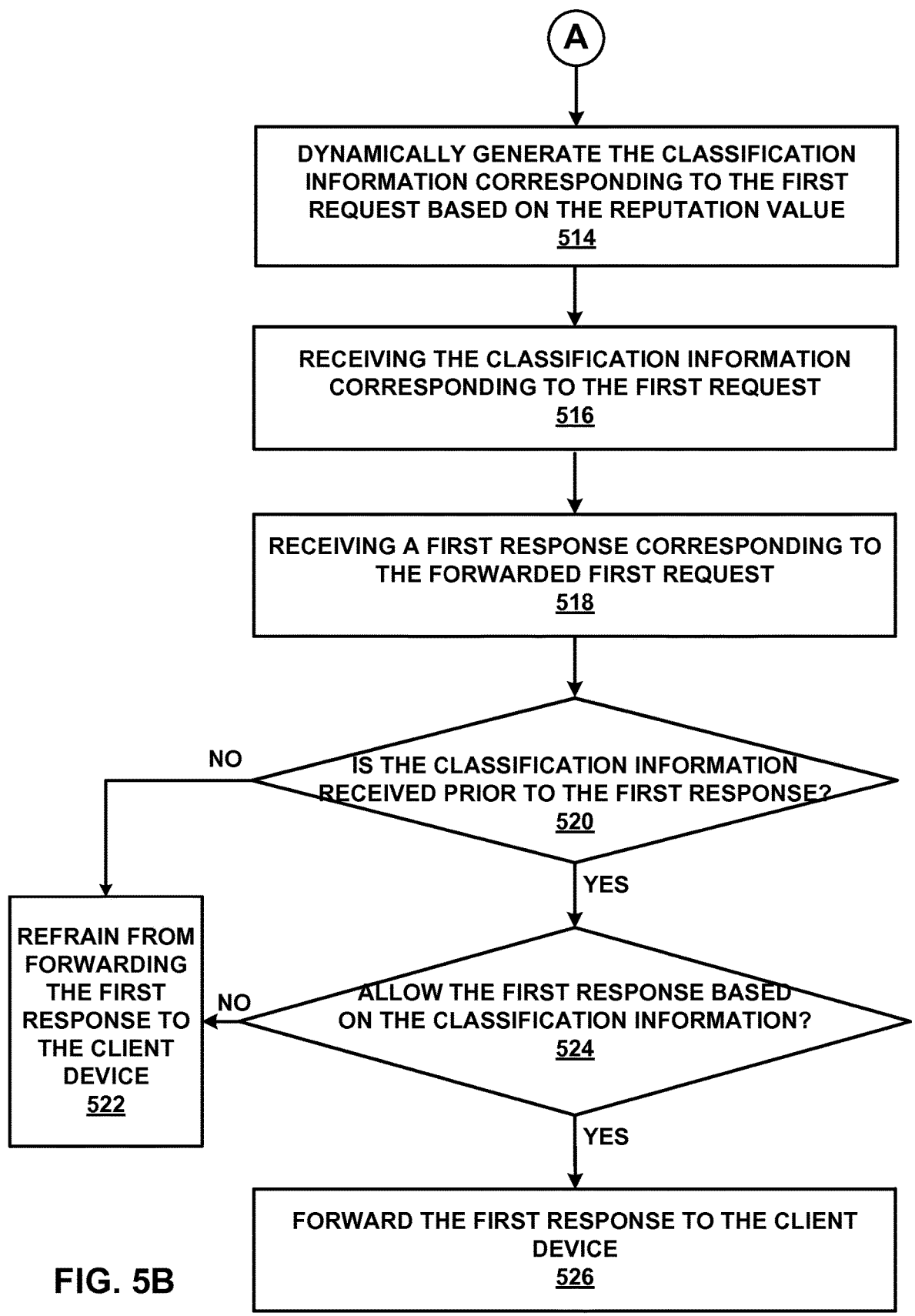

FIGS. 5A and 5B illustrates another example process 500 for classifying an application session for forwarding or refraining from forwarding to a client according to embodiments of the present disclosure. The process 500 as illustrated FIG. 5A begins when a first request from a client device is received (one or more operations indicated by block 502). The first request is for obtaining application data. For example, the first request is for obtaining data from a website hosted by the web server 150, 155 or 158. A second request is generated based on the first request (one or more operations indicated by block 504). For example, the request processing module 304 extracts a web address such as a Hypertext Transfer protocol (http) address from packets of the first request and generates a second request to include the web address.

A first priority for transmitting the second request and a second priority for forwarding the first request are determined (one or more operations indicated by block 506). In some embodiments, the request prioritization module 306 assigns a first priority to the second request by putting the second request in a high priority queue. The request prioritization module 306 assigns a second priority to the first request by putting the second request in a low priority queue. The first priority is higher than the second priority. The second request to obtain classification information corresponding to the first request is then transmitted (one or more operations indicated by block 508). The first request from the client device is also forwarded prior to receiving the classification information corresponding to the first request (one or more operations indicated by decision block 510).

A reputation value corresponding to the second request is determined (one or more operations indicated by block 512). For example, a high-risk website may have a reputation value 10 while a low-risk website may have a reputation value 70. In some embodiments, the classification engine 310 receives reputation information of a website from a third-party server (not shown) and determines a reputation value based on the received information. In other embodiments, the classification engine 310 also determines a reputation value for a website based on information regarding previous interactions with the website.

Referring now to FIG. 5B, the classification information corresponding to the first request is dynamically generated based on the reputation value (one or more operations indicated by block 514). The classification information includes at least a category that the web address belongs to. The classification information corresponding to the first request is received (one or more operations indicated by block 516). A first response corresponding to the forwarded first request is received (one or more operations indicated by block 518). The action module 312 identifies the time when the classification information was received and the time when the response was received. For example, the action module 312 identifies respective receiving time for the classification information and the response based on time stamps included in the data packets of the classification information and the response. The action module 312 then determines an action to be performed on the response based on the receiving time and the classification information.

If it is determined that the classification information is not received prior to the first response (520—No), then the first response is restrained from forwarding to the client device (one or more operations indicated by block 522). If it is determined that the classification information is received prior to the first response (520—Yes), a determination whether the first response should be allowed is made based on the classification information (one or more operations indicated by block 524). If it is determined that the first response should be denied based on the classification information (524—No), then the first response is restrained from forwarding to the client device (one or more operations indicated by block 522). If it is determined that the first response should be allowed based on the classification information (524—Yes), then the first response is forwarded to the client device (one or more operations indicated by block 526).

Figure 6:
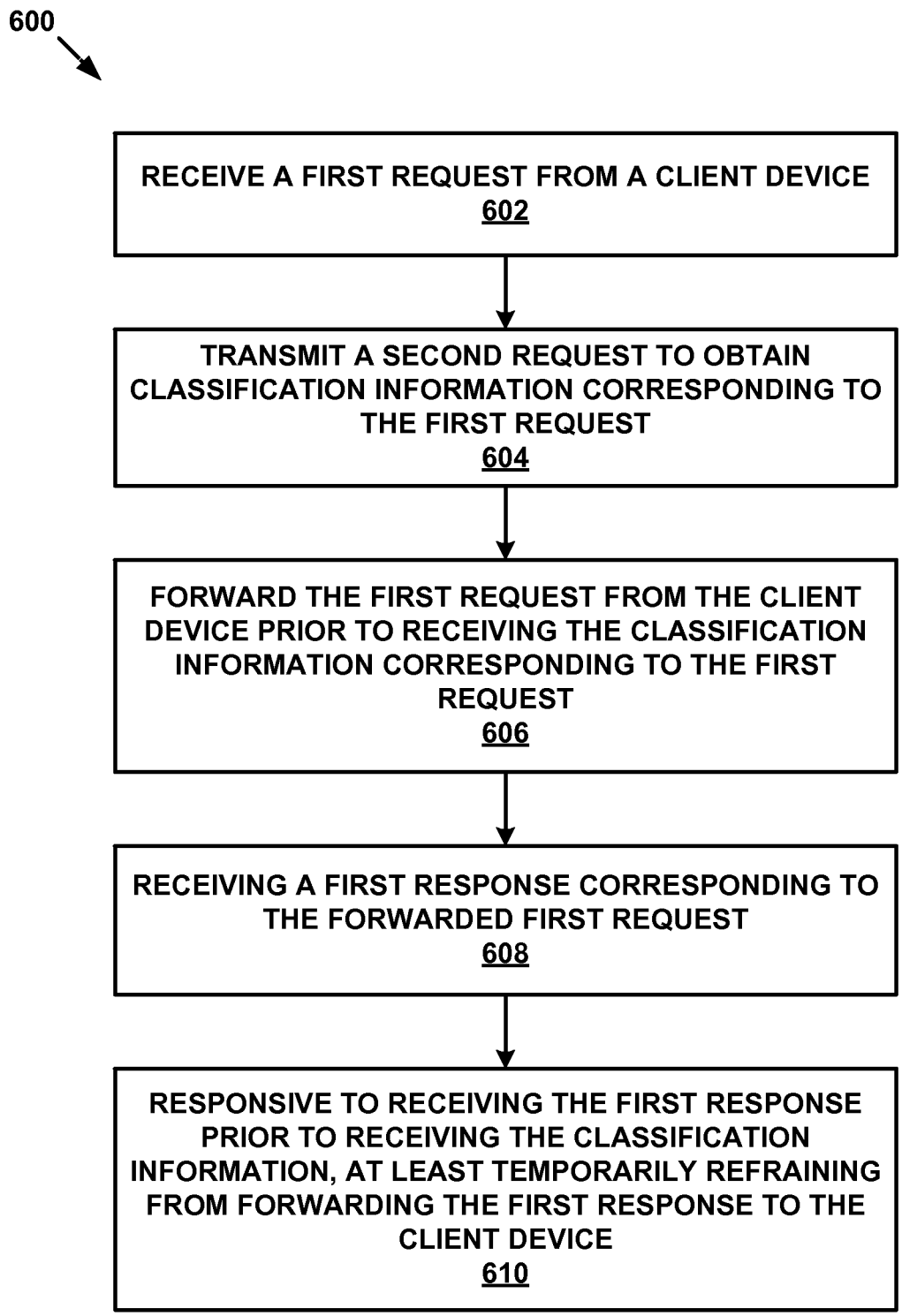
FIG. 6 illustrates an example process for temporarily refraining from forwarding an application response to a client according to embodiments of the present disclosure.

FIG. 6 illustrates an example process 600 for temporarily refraining from forwarding an application response to a client according to embodiments of the present disclosure. The process 600 as illustrated FIG. 6 begins with a first request from a client device being received (one or more operations indicated by block 602). A second request to obtain classification information corresponding to the first request is then transmitted (one or more operations indicated by block 604). The first request from the client device is forwarded prior to receiving the classification information corresponding to the first request (one or more operations indicated by decision block 606).

A first response corresponding to the forwarded first request is received (one or more operations indicated by block 608. Responsive to receiving the first response prior to receiving the classification information, the first response is at least temporarily refrained from forwarding to the client device (one or more operations indicated by block 610). In some embodiments, the action module 312 refrains from forwarding the response to the client by dropping the response packets. In other embodiments, the action module 312 refrains from forwarding the response to the client by sending a refresh page to the client for retransmitting the original request. In some other embodiments, the action module 312 refrains from forwarding the response to the client by redirecting the client to a particular webpage that is different than the webpage in the response.

Figure 7:
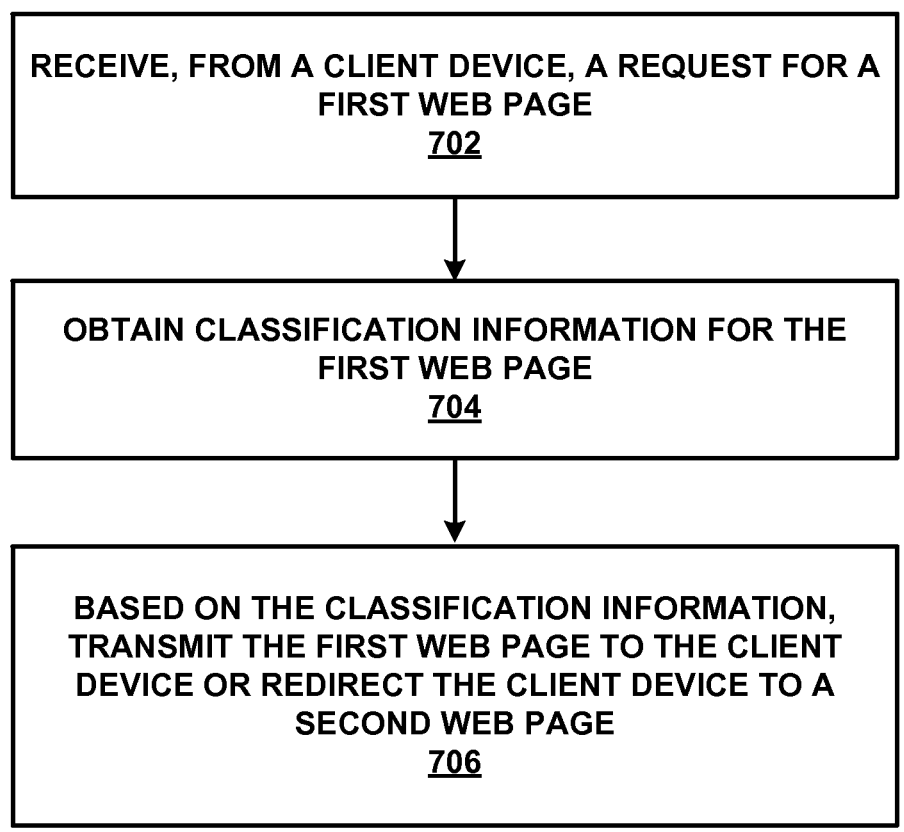
FIG. 7 illustrates an example process for determining a webpage for transmitting to a client based on classification information according to embodiments of the present disclosure.

FIG. 7 illustrates an example process 700 for determining a webpage for transmitting to a client based on classification information according to some embodiments of the present disclosure. The process 700 as illustrated in FIG. 7 begins with a request for a first webpage being received from a client device (one or more operations indicated by block 702). Classification information for the first webpage is obtained (one or more operations indicated by block 704). Based on the classification information, the first webpage is transmitted to the client device or the client device is redirect to a second webpage (one or more operations indicated by decision block 706). In some embodiments, the action module 312 redirects the client to a webpage using captive portal technique. For example, the action module 312 redirects the client to an authentication webpage. If the client provides the correct credentials, the action module 312 will continue to determine which action to be performed on the response. If the client fails to input the credentials, the action module 312 will drop the response. In another example, the action module 312 redirects the client to a webpage where the client gets charged. The action module 312 then determines which action to be performed on the response based not only on the classification information but also on whether the client pays. If the client does not pay, the client will not get the response.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are example and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor, cause the processor to:
    receive, from a client device, a first request for a data packet of a webpage;
    generate, based on the first request, a second request to obtain classification information for the first request from a classification engine, assign a first priority to the second request, and direct the second request to a first queue for transmission according to the first priority;
    assign a second priority to the first request and forward the first request to obtain the data packet, wherein first request is placed in a second queue for transmission according to the second priority, the first priority being a higher priority than the second priority, increasing a probability that the requested classification information is received prior to actual forwarding of the data packet to the client device;
    receive the data packet in response to the first request prior to receiving the classification information, the receipt of the data packet occurring as a result of an unintentional packet leak;
    based on receiving the data packet prior to receiving the classification information, refrain from forwarding the data packet to the client device at least until receiving the classification information;
    receive the requested classification information in response to the second request, wherein the classification information is dynamically generated and includes dynamic reputation information associated with the webpage, additional time being provided for the dynamic generation of the classification information and the receipt of the requested classification information by the processor by a time difference between the forwarding of the first request to a server hosting the webpage and transmission of the second request to the classification engine; and
    determine whether to forward or refrain from forwarding the data packet to the client device based on the classification information.

2. The medium of claim 1, comprising instructions to forward, based on the classification information, the data packet to the client device.

3. A non-transitory computer readable medium comprising instructions which, when executed by a processor, cause the processor to:
receive, by a network device, a first request from a client device for a data packet of a webpage;
generate, by the network device, a second request based on the first request to obtain classification information for the first request from a classification engine, assign a first priority to the second request, and direct the second request to a first queue for transmission according to the first priority;
assign a second priority to the first request and forward, by the network device, the first request to a server to obtain the data packet, wherein first request is placed in a second queue for transmission according to the second priority, the first priority being a higher priority than the second priority, increasing a probability that the requested classification information is received prior to actual forwarding of the data packet to the client device;
receive, by the network device, the data packet from the server, the data packet being received by the network device prior to receiving the classification information, the receipt of the data packet occurring as a result of an unintentional packet leak;
refrain, by the network device, from forwarding the data packet to the client device prior to receiving, by the network device, the classification information;
receive the classification information in response to the second request, wherein the classification information is dynamically generated and includes dynamic reputation information associated with the webpage, additional time being provided for the dynamic generation of the classification information and the receipt of the requested classification information by the processor by a time difference between the forwarding of the first request to a server hosting the webpage and transmission of the second request to the classification engine; and
determine, by the network device, whether to forward or refrain from forwarding the data packet to the client device based on the classification information.

4. The medium of claim 3, comprising instructions to forward, subsequent to receiving the classification information, the data packet to the client device.

5. The medium of claim 3, comprising instructions to:
receive an additional request from the client device;
receive the classification information for the first request subsequent to receiving the additional request from the client device; and
based on the classification information, forward the data packet to the client device in response to the additional request from the client device.

6. The medium of claim 5, comprising instructions to modify a response including the data packet to match attributes of the second request prior to forwarding the data packet to the client device in response to the second request, wherein the response is received in response to the forwarded first request.

7. A method for handling of webpage requests utilizing dynamic classification comprising:
receiving, from a client device, a first request for a webpage;
generating, based on the first request, a second request for obtaining classification information for the webpage, assigning a first priority to the second request, and directing the second request to a first queue for transmission according to the first priority;
assigning a second priority to the first request and forwarding the first request to obtain the webpage, wherein first request is placed in a second queue for transmission according to the second priority, the first priority being a higher priority than the second priority, increasing a probability that the requested classification information is received prior to actual forwarding of the data packet to the client device;
receiving the webpage prior to obtaining the classification information, the receipt of the webpage occurring as a result of an unintentional packet leak;
refraining from forwarding a data packet of the webpage to the client device at least until obtaining the classification information for the webpage:
receiving the requested classification information in response to the second request, wherein the classification information is dynamically generated and includes dynamic reputation information associated with the webpage, additional time being provided for the dynamic generation of the classification information and the receipt of the requested classification information by the processor by a time difference between the forwarding of the first request to a server hosting the webpage and transmission of the second request to the classification engine; and
responsive to receiving the classification information, determining whether to transmit the webpage to the client device or to refrain from transmitting the webpage to the client device based on the classification information.

8. The method of claim 7, further comprising:
forwarding, based on the classification information, the data packet to the client device.

9. The medium of claim 1, wherein the reputation information includes a reputation value.

10. The medium of claim 1, wherein the second request is a copy of the first request.

11. The medium of claim 3, including instructions to: store, by the network device, the classification information on a local store; and record, by the network device, the classification information on the local store with a timestamp.

12. The medium of claim 1, further including instructions to:
select an option for refraining from forwarding the data packet.

13. The medium of claim 12, wherein the selection of the option for refraining from forwarding the data packet is based at least in part on the webpage requested by the client device.

14. The medium of claim 12, wherein the option for refraining from forwarding the data packet includes one or more of:
dropping the data packet without returning a response to the client device;
sending a refresh page the client device; or
redirecting the client device to a second webpage that is different than the webpage requested by the client device.

15. The medium of claim 3, further including instructions to:

select an option for refraining from forwarding the data packet.

16. The medium of claim 15, wherein the selection of the option for refraining from forwarding the data packet is based at least in part on the webpage requested by the client device.

17. The medium of claim 15, wherein the option for refraining from forwarding the data packet includes one or more of:
   dropping the data packet without returning a response to the client device;
   sending a refresh page the client device; or
   redirecting the client device to a second webpage that is different than the webpage requested by the client device.

18. The method of claim 7, further comprising:
   selecting an option for refraining from forwarding the data packet, wherein the selection of the option for refraining from forwarding the data packet is based at least in part on the webpage requested by the client device.

19. The method of claim 18, wherein the option for refraining from forwarding the data packet includes one or more of:
   dropping the data packet without returning a response to the client device;
   sending a refresh page the client device; or
   redirecting the client device to a second webpage that is different than the webpage requested by the client device.

* * * * *